US012115851B2

(12) United States Patent
Fujii

(10) Patent No.: US 12,115,851 B2
(45) Date of Patent: Oct. 15, 2024

(54) TANK DEVICE

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 519 days.

(21) Appl. No.: 17/523,026

(22) Filed: Nov. 10, 2021

(65) Prior Publication Data

US 2022/0203826 A1    Jun. 30, 2022

(30) Foreign Application Priority Data

Dec. 28, 2020   (JP) .................................. 2020-218619

(51) Int. Cl.
*B60K 15/067*   (2006.01)
*F17C 13/08*    (2006.01)
(52) U.S. Cl.
CPC .......... *B60K 15/067* (2013.01); *F17C 13/084* (2013.01); *F17C 2201/0109* (2013.01); *F17C 2203/0604* (2013.01); *F17C 2203/0673* (2013.01); *F17C 2205/0103* (2013.01); *F17C 2205/0305* (2013.01); *F17C 2205/0323* (2013.01); *F17C 2221/012* (2013.01); *F17C 2270/0184* (2013.01)
(58) Field of Classification Search
CPC ............................ F17C 13/084; B60K 15/067
See application file for complete search history.

(56) References Cited

U.S. PATENT DOCUMENTS

| 10,076,956 | B2 * | 9/2018 | Ohashi | B60K 15/07 |
| 10,293,684 | B2 * | 5/2019 | Sasaki | B60L 50/72 |
| 10,794,542 | B2 * | 10/2020 | Ogiwara | F17C 13/12 |
| 11,932,102 | B2 * | 3/2024 | Katano | B62D 65/02 |
| 2017/0282709 | A1 | 10/2017 | Sasaki et al. | |
| 2019/0226641 | A1 | 7/2019 | Ogiwara et al. | |

FOREIGN PATENT DOCUMENTS

| DE | 10 2018 122 439 A1 | 3/2020 |
| JP | 2009220680 A | 10/2009 |
| JP | 2011042208 A | 3/2011 |
| JP | 2017185843 A | 10/2017 |
| JP | 2017206042 A * | 11/2017 |
| JP | 2019128012 A | 8/2019 |

* cited by examiner

*Primary Examiner* — Tony H Winner
*Assistant Examiner* — Hosam Shabara
(74) *Attorney, Agent, or Firm* — SoraIP, Inc.

(57) ABSTRACT

A tank device mounted on a vehicle body includes a tank, and a fixing device that fixes the tank to a vehicle body. The tank includes a boss located at its one end, and a flow path member fixed in an opening portion of the boss, the flow path member serving as a flow path that allows the inside of the tank to communicate with the outside. The fixing device includes a first end portion and a second end portion, the first end portion being sandwiched between an end of the opening portion and the flow path member, and the second end portion being fixed to a fixing portion of the vehicle body.

3 Claims, 8 Drawing Sheets

TANK DEVICE

CROSS-REFERENCE TO RELATED APPLICATION

This application claims priority to Japanese Patent Application No. 2020-218619 filed on Dec. 28, 2020, incorporated herein by reference in its entirety.

BACKGROUND

1. Technical Field

The present disclosure relates to tank devices.

2. Description of Related Art

In related art, a structure in which a bracket attached to a boss of a tank is fixed to a vehicle body is known as a structure for fixing, for example, a tank storing fuel gas to a vehicle body (e.g., Japanese Unexamined Patent Application Publication No. 2017-185843 (JP 2017-185843 A)). The bracket of JP 2017-185843 A has an engaging portion and is fixed to the boss by engaging the engaging portion with an engaged portion of the boss.

SUMMARY

However, in order to use the bracket described in JP 2017-185843 A, the boss needs to have the engaged portion. The boss therefore has an increased length in the axial direction. A vehicle body has limited space for a tank. Accordingly, when using the boss having an increased length in the axial direction, it is necessary to reduce the length in the axial direction of the body of the tank. This may result in reduction in capacity of the tank.

The present disclosure can be implemented in the following aspect.

(1) According to an aspect of the present disclosure, a tank device configured to be mounted on a vehicle body is provided. The tank device includes a tank and a fixing device that fixes the tank to the vehicle body. The tank includes a boss and a flow path member fixed in an opening portion of the boss, the flow path member serving as a flow path that allows inside of the tank to communicate with outside. The fixing device includes a first end portion and a second end portion, the first end portion being sandwiched between an end of the opening portion and the flow path member, and the second end portion being fixed to a fixing portion of the vehicle body. The fixing device is fixed to the boss by sandwiching the first end portion between the boss and the flow path member. According to this aspect, since the boss need not have an engaged portion, it is less likely that the tank capacity is reduced due to the increase in length of the boss.

(2) The fixing device may include a first member including the first end portion, and a second member connected to the first member and including the second end portion. The position and shape of a fixing portion of a vehicle body of a vehicle often vary depending on the vehicle model. According to this aspect, since the first member has a shape common to all the vehicle models and the second member has a shape different depending on the vehicle model, the fixing device can be used for various vehicle models.

(3) The first member may include: a boss-side member including a first joint portion in a portion different from the first end portion; a vehicle body-side member including a first end and a second end, the first end being a second joint portion facing the first joint portion, and the second end being connected to the second member; and an elastic body located between the first joint portion and the second joint portion and connecting the first joint portion and the second joint portion. According to this aspect, since vibration produced by a valve can be absorbed by the elastic body, transmission of the vibration to the vehicle body via the fixing device can be reduced.

(4) The first joint portion may include a first intermediate portion and a second intermediate portion, the first intermediate portion extending in an axial direction of the tank, and the second intermediate portion extending in a direction that crosses the axial direction and that is away from the boss. The second joint portion may include a first opposing portion and a second opposing portion, the first opposing portion facing the first intermediate portion, and the second opposing portion facing the second intermediate portion. The elastic body may include a first connecting portion and a second connecting portion, the first connecting portion connecting the first intermediate portion and the first opposing portion, and the second connecting portion connecting the second intermediate portion and the second opposing portion. According to this aspect, stress applied to the elastic body when the tank expands and contracts in the axial direction can be distributed to the first connecting portion and the second connecting portion. Moreover, when the tank expands and contracts in the axial direction, compressive stress or tensile stress is applied to the second connecting portion instead of shear stress. Since the elastic body tends to be degraded by shear stress, degradation of the elastic body can be reduced by using a configuration in which compressive stress or tensile stress is applied.

(5) The first intermediate portion may be separated from the boss. According to this aspect, the first member can be attached without interfering with the boss. The present disclosure can also be implemented in a form other than a fixing bracket. For example, the present disclosure can be implemented by a method for attaching a tank to a vehicle body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
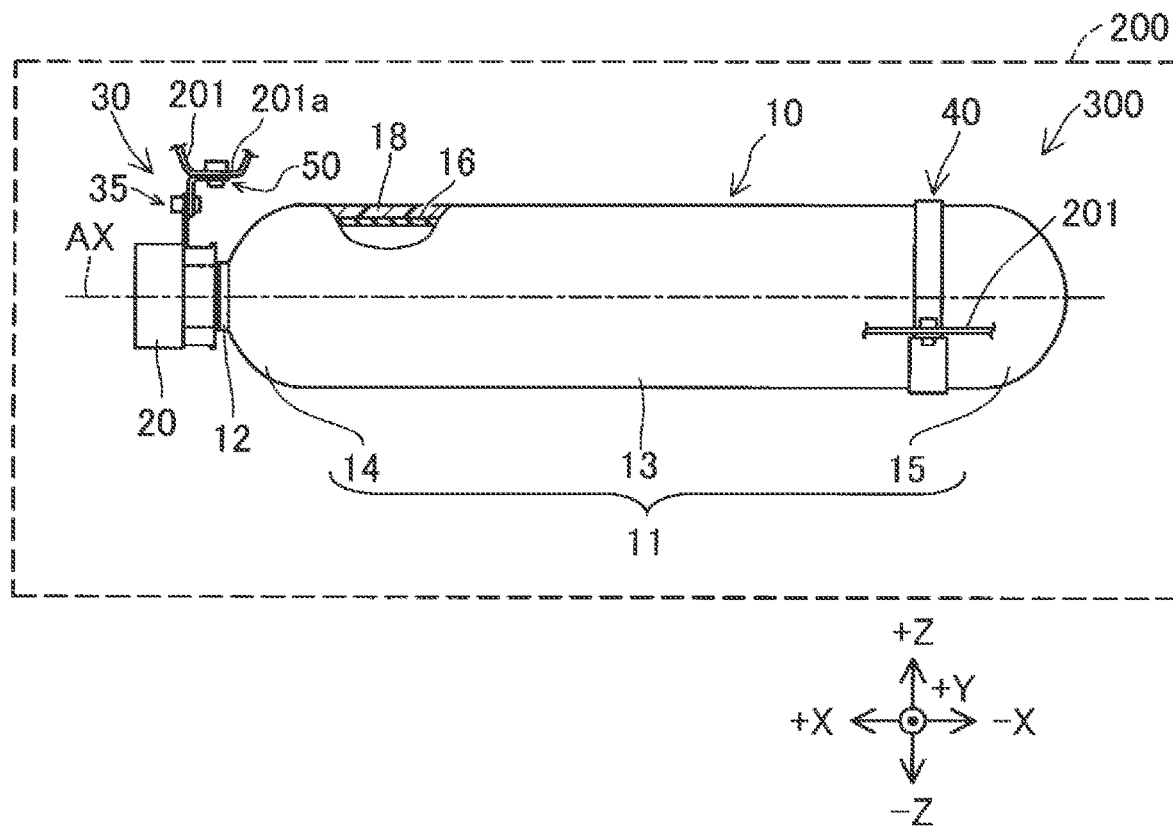
FIG. 1 is a schematic view of a tank device.

FIG. 1 is a schematic view of a tank device 300 mounted on a vehicle body 201 of a vehicle 200. The tank device 300 includes a tank 10 and a fixing device 30 for fixing the tank 10 to the vehicle body 201. The tank 10 stores fuel gas that is used for power generation of a fuel cell mounted on the vehicle 200. In the present embodiment, the vehicle 200 is a fuel cell vehicle, and the fuel gas is hydrogen gas. The vehicle 200 is not limited to the fuel cell vehicle. The fuel gas is not limited to the hydrogen gas and may be gas such as liquefied petroleum (LP) gas. The X, Y, and Z directions that are perpendicular to each other are used in the following description. Positive and negative signs are used to specify the direction. The direction with a positive sign "+" indicates a positive direction, and the direction with a negative sign "−" indicates a negative direction. The X direction is the direction of the central axis AX of the tank 10, and the +X direction is the direction toward a boss 12 (that will be described later).

The tank 10 is attached to the vehicle body 201 by the fixing device 30 and a band 40.

The tank 10 includes a tank body 11, the boss 12, and a valve 20 that serves as a flow path member. The tank body 11 has a cylindrical portion 13, a first dome portion 14, and a second dome portion 15. The cylindrical portion 13 has a cylindrical shape. The first dome portion 14 and the second dome portion 15 are located at both ends in the X direction of the cylindrical portion 13. The first dome portion 14 and the second dome portion 15 have a generally hemispherical shape protruding toward the ends in the X direction of the tank 10. The boss 12 is attached to one end of the tank 10. Specifically, the boss 12 is attached to the top of the first dome portion 14. The boss 12 has a cylindrical shape and allows the internal space of the tank body 11 to communicate with the outside. The central axis of both the cylindrical portion 13 and the boss 12 is the central axis AX. The valve 20 is attached to the boss 12. In the present embodiment, the valve 20 is a solenoid valve. A gas pipe, not shown, is connected to the valve 20. The fuel gas is supplied to the fuel cell and the tank 10 is filled with the fuel gas, both through the gas pipe.

The tank body 11 has a liner 16 and a reinforcing layer 18. The liner 16 is a hollow container made of, for example, a resin with gas barrier properties such as polyamide. The reinforcing layer 18 is provided around the liner 16. The reinforcing layer 18 is made of, for example, a fiber reinforced plastic such as carbon fiber reinforced plastic (CFRP). The tank 10 is manufactured by winding fibers around the liner 16 having the boss 12 attached thereto by a filament winding process.

The fixing device 30 is a device for fixing the tank 10 to the vehicle body 201 by what is called a neck mounting method. One end of the fixing device 30 is attached to the boss 12 of the tank 10, and the other end of the fixing device 30 is fixed to a fixing portion 201a of the vehicle body 201 by fasteners 50. The band 40 is attached to the cylindrical portion 13 at a position between the middle in the X direction of the tank 10 and the end in the −X direction of the cylindrical portion 13. The band 40 has a plurality of members surrounding the cylindrical portion 13. The band 40 is placed so as to surround the cylindrical portion 13, and the band 40 and the vehicle body 201 are fastened together. The band 40 is thus fixed to the vehicle body 201 in such a manner that the band 40 holds the tank 10.

Figure 2:
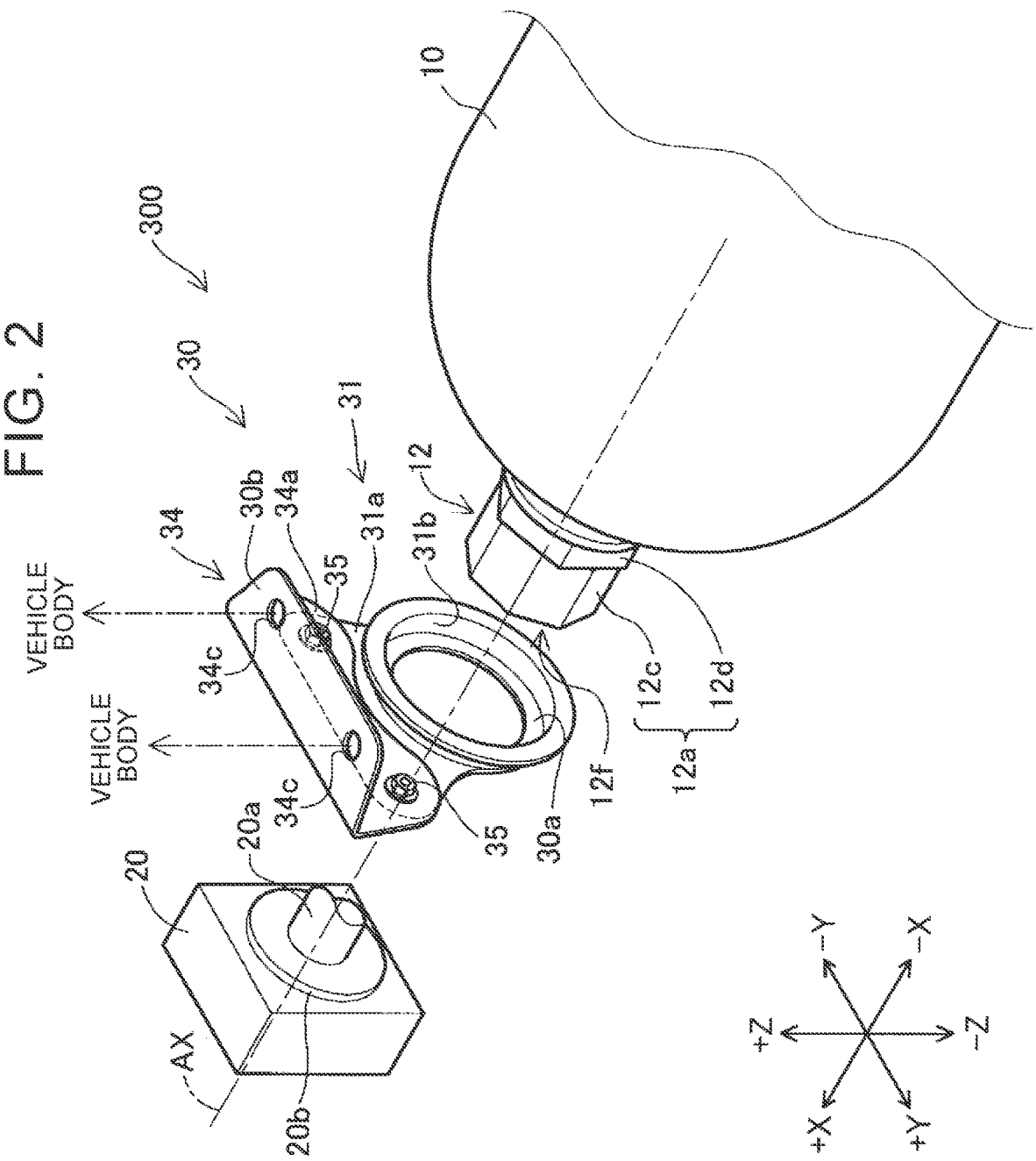
FIG. 2 is an exploded perspective view of a fixing device.

FIG. 2 is a perspective view of the tank device 300 according to the present embodiment. As described above, the tank device 300 includes the tank 10 and the fixing device 30. The fixing device 30 includes one end portion 30a and the other end portion 30b. The one end portion 30a has an annular shape and is sandwiched between an end (end face in the +X direction that defines an opening) of an opening portion 12f of the boss 12 and the valve 20. The other end portion 30b is in the shape of a flat plate and is fixed to the fixing portion 201a (FIG. 1) of the vehicle body 201.

For example, the boss 12 is made of a metal such as aluminum. The boss 12 has a cylindrical boss portion 12a and the opening portion 12f. The opening portion 12f allows the inside of the tank 10 to communicate with the outside. The cylindrical boss portion 12a has a cylindrical shape. The cylindrical boss portion 12a has a first knob portion 12c and a second knob portion 12d. The first knob portion 12c is located at the end in the +X direction of the cylindrical boss portion 12a. The outer peripheral surface of the first knob portion 12c is octagonal as viewed in the X direction. The first knob portion 12c is a portion that is held when fibers are wound around the liner 16 having the boss 12 attached thereto. The second knob portion 12d is not covered by a first member 31 (that will be described later) and is exposed. The outer peripheral surface of the second knob portion 12d is hexagonal as viewed in the X direction. The second knob portion 12d is a portion that is held when the valve 20 is screwed to the tank 10. The shapes of the outer peripheral surfaces of the first and second knob portions 12c, 12d as viewed in the X direction are not limited to the shapes described above, and may be a shape with parallel sides facing each other with the central axis AX therebetween. It is easy to hold the first and second knob portions 12c, 12d with such a shape. In FIG. 2, the outer peripheral surface of the second knob portion 12d is shown protruding beyond the outer peripheral surface of the first knob portion 12c. However, the outer peripheral surface of the first knob portion 12c may be flush with the outer peripheral surface of the second knob portion 12d, or the outer peripheral surface of the second knob portion 12d may be recessed with respect to the outer peripheral surface of the first knob portion 12c The outer peripheral surface of the first knob portion 12c and the outer peripheral surface of the second knob portion 12d may have the same shape as viewed in the X direction.

The valve 20 has a first cylindrical valve portion 20a and a second cylindrical valve portion 20b. The first cylindrical valve portion 20a is placed inside the first knob portion 12c of the boss 12. Although not shown in the figure, the first cylindrical valve portion 20a has a threaded outer peripheral surface, and the cylindrical boss portion 12a has a threaded inner peripheral surface 12e (see FIG. 4). The valve 20 is attached to the tank 10 by screwing the valve 20 into the boss 12. The second cylindrical valve portion 20b is located on the +X direction side of the first cylindrical valve portion 20a. The outer peripheral surface of the second cylindrical valve portion 20b is circular as viewed in the X direction.

As described above, the fixing device 30 has the one end portion 30a and the other end portion 30b. Specifically, the fixing device 30 includes the first member 31 and a second member 34. The second member 34 is connected to the first member 31 by fasteners 35. The first member 31 has the one end portion 30a, a fastening first member portion 31a, and a cylindrical first member portion 31b. The one end portion 30a is sandwiched between the end of the opening portion 12f and the valve 20. The one end portion 30a has an annular shape in order to insert the valve 20 therethrough. The fastening first member portion 31a extends in the +Z direction from the end in the +X direction of the one end portion 30a. The fastening first member portion 31a has two through holes, not shown, in its end in the +Z direction in order to insert the fasteners 35 therethrough. The cylindrical first member portion 31b has a cylindrical shape that covers the first knob portion 12c. The cylindrical first member portion 31b is located on the −X direction side of the one end portion 30a. The second member 34 has the other end portion 30b and a fastening second member portion 34a. The fastening second member portion 34a is a connection portion with the first member 31. That is, the second member 34 has the other end portion 30b in a portion different from the fastening second member portion 34a. The second member 34 is in the shape of a bent flat plate. Specifically, the fastening second member portion 34a extends perpendicularly to the central axis AX, and the other end portion 30b extends along the central axis AX. The other end portion 30b is fixed to the fixing portion 201a (see FIG. 1) of the vehicle body 201. The fastening first member portion 31a and the fastening second member portion 34a are disposed so as to at least partially overlap each other. The fastening second member portion 34a has through holes, not shown, at positions facing the through holes in the fastening first member portion 31a. A bolt 35a (see FIG. 4) of the fastener 35 is inserted through the through hole of the fastening first member portion 31a and the through hole of the fastening second member portion 34a. The fastening first member portion 31a and the fastening second member portion 34a are connected together by tightening the bolt 35a and a nut 35b (see FIG. 4) of the fastener 35.

The one end portion 30a having an annular shape is located in such a manner that the radial direction of the one end portion 30a matches the radial direction of the boss 12. The one end portion 30a is sandwiched and fixed between the end of the opening portion 12f and the valve 20 in the X direction that is a direction along the central axis AX. The one end portion 30a is placed so as to cover the outer periphery of the second cylindrical valve portion 20b of the valve 20. The thickness in the X direction of the one end portion 30a need only be large enough that the one end portion 30a has sufficient strength to hold the tank 10. In the present embodiment, the one end portion 30a has a thickness of about 1 mm or more and 3 mm or less in the X direction. The cylindrical first member portion 31b is placed so as to cover the outer periphery of the first knob portion 12c of the boss 12.

The other end portion 30b has through holes 34c. A bolt 51 (see FIG. 4) of the fastener 50 (see FIG. 1) is inserted through the through hole 34c and a through hole, not shown, provided in the fixing portion 201a (see FIG. 1). The tank 10 is fixed to the vehicle body 201 by tightening the bolt 51 and a nut 52 (see FIG. 4) of the fastener 50.

Figure 3:
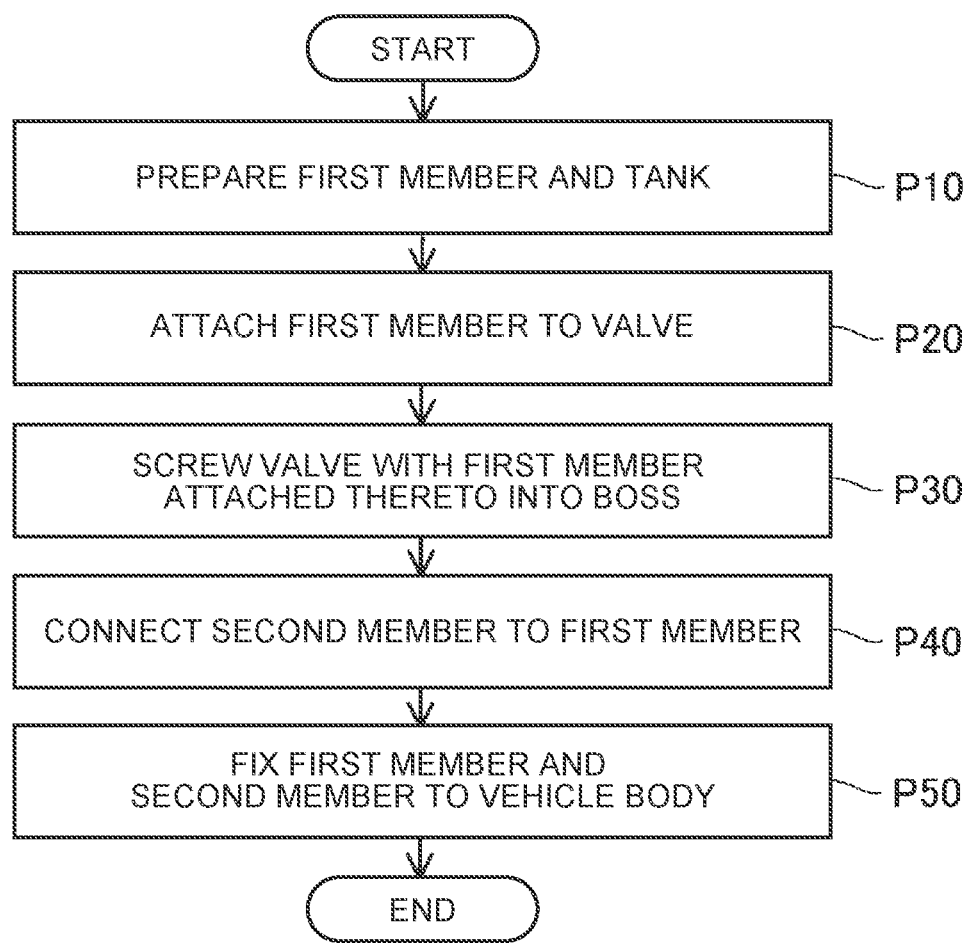
FIG. 3 is a flowchart of a process of attaching a tank to a vehicle body.

A method for attaching the tank 10 to the vehicle body 201 using the fixing device 30 will be described. FIG. 3 is a flowchart of a process of attaching the tank 10 to the vehicle body 201. In step P10, the first member 31 and the tank 10 having the valve 20 are prepared. In step P20, the first member 31 is attached to the valve 20. Specifically, the one end portion 30a of the first member 31 is fitted on the second cylindrical valve portion 20b of the valve 20. In step P30, the valve 20 having the first member 31 attached thereto is inserted and screwed into the boss 12. The exposed second knob portion 12d is held during the screwing. Torque can thus be efficiently applied with the boss 12 being fixed. In step P40, the second member 34 is connected to the first member 31 by the fasteners 35. In step P50, the first and second members 31, 34 attached to the tank 10 are fastened to the vehicle body 201 by the fasteners 50. Attachment of the tank 10 to the vehicle body 201 is thus finished.

In the neck mounting method of the related art, the fixing device is fixed to the outer peripheral surface of the boss 12. For example, when the fixing device is fixed to the outer peripheral surface of the boss 12 by screwing, a threaded portion of the fixing device need to be long enough to reduce shear of the threaded portion that is caused by the impact in the event of a collision of the vehicle 200. Specifically, the length of the threaded portion of the fixing device is often 10 mm or more. Like the screwing of the valve 20 into the boss 12, the threaded portion for fastening the fixing device is disposed so that the longitudinal direction of the threaded portion matches the X direction. Accordingly, the longer the threaded portion, the longer the boss 12 in the X direction. In this respect, in the fixing device 30 according to the present embodiment, the fixing device 30 is not fixed to the boss 12 by screwing, but is fixed by being sandwiched between the boss 12 and the valve 20. By fastening the boss 12 and the valve 20, the fixing device 30 is held between the boss 12 and the valve 20. The fixing device 30 is thus fixed to the boss 12. That is, no threaded portion for fastening the boss 12 to the fixing device 30 need be provided on the boss 12. As described above, the thickness of the one end portion 30a sandwiched between the boss 12 and the valve 20 is only about 1 mm or more and 3 mm or less. It is therefore less likely that the boss 12 becomes longer than the fixing device of the related art. The vehicle 200 has limited space for the tank 10. Accordingly, when the boss 12 has an increased length in the X direction, it is necessary to reduce the length in the X direction of the tank body 11. Reducing the length of the tank body 11 may result in reduction in capacity of the tank 10. In the present embodiment, since the boss 12 can be made shorter than the fixing device of the related art, the capacity of the tank 10 can be made larger than the capacity of the tank 10 using the fixing device of the related art.

For the fixing device of the related art, the boss 12 is long in the X direction as described above. Accordingly, in order to reduce a decrease in capacity of the tank 10, a boss that is shorter in the X direction than the fixing device for the neck mounting method is often used for the tank 10 that is fixed by a fixing method other than the neck mounting method. In this respect, for the fixing device 30 of the present embodiment, an increase in length in the X direction of the boss 12 is reduced. Accordingly, the common boss 12 can be used for both the tank 10 that is fixed by the neck mounting method and the tank 10 that is fixed by a fixing method other than the neck mounting method.

The position where the tank 10 is attached to the vehicle body 201 often varies depending on the vehicle model. In the present embodiment, the fixing device 30 is composed of the first member 31 and the second member 34. Accordingly, by designing the first member 31 as a component common to all vehicle models and the second member 34 as a component different depending on the vehicle model, the fixing device 30 can be made compatible with various vehicle models. When the manufacturing factory for the tank 10 and the assembly factory for the vehicle 200 are different, the steps up to P30 can be performed at the manufacturing factory for the tank 10, and step P40 and the subsequent steps can be performed at the assembly factory for the vehicle 200. At the manufacturing factory for the tank 10, the management cost can be reduced by managing the tanks 10 having the common first member 31 attached thereto regardless of the vehicle model.

According to the first embodiment described above, the fixing device 30 is fixed to the boss 12 by sandwiching the one end portion 30a between the boss 12 and the valve 20. Since the boss 12 need not have an engaged portion on its outer peripheral surface, it is less likely that the tank capacity is reduced due to the increase in length of the boss 12. The fixing device 30 is composed of the first member 31 and the second member 34. Since the first member 31 has a shape common to all the vehicle models and the second member 34 has a shape different depending on the vehicle model, the fixing device can be used for various vehicle models.

B. Second Embodiment

Figure 4:
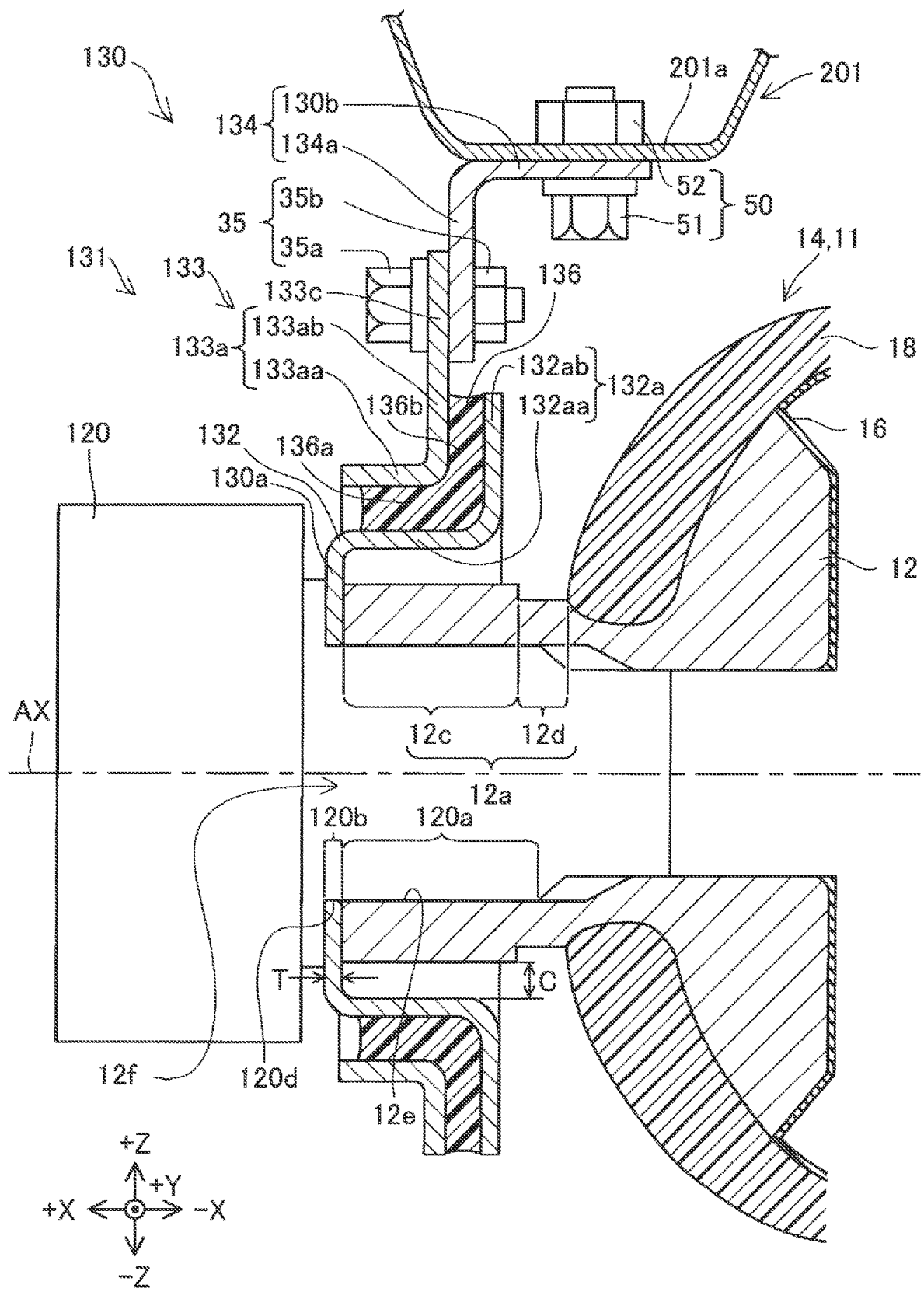
FIG. 4 is a sectional view of a fixing device according to a second embodiment.
Figure 5:
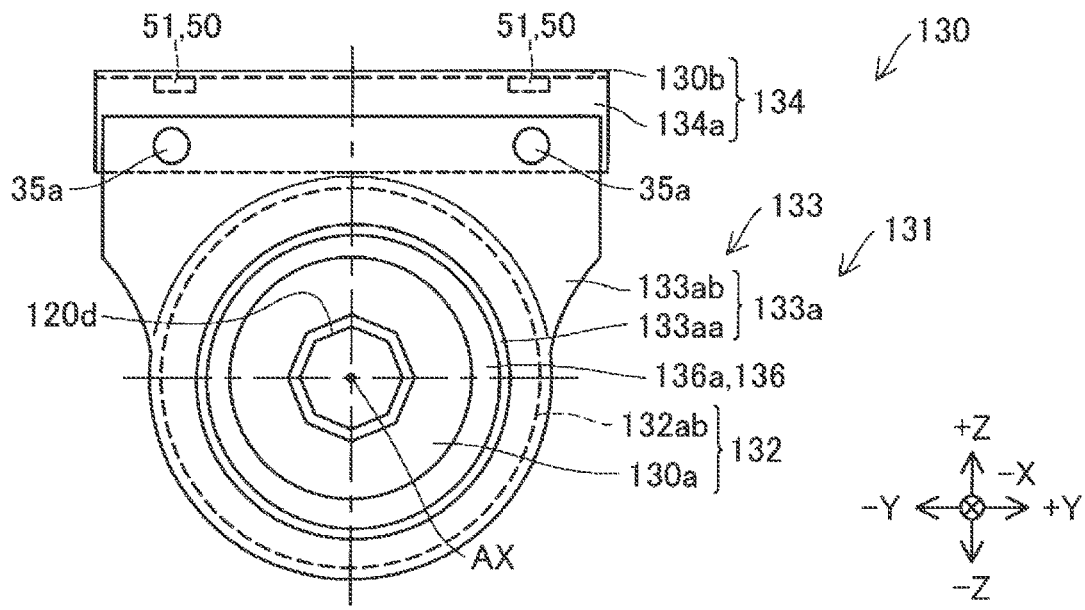
FIG. 5 is a plan view of the fixing device as viewed in an X direction according to the second embodiment.

FIG. 4 is a sectional view of a fixing device 130 according to a second embodiment, taken along a plane passing through the central axis AX and extending in the Z direction. For convenience, the section of a valve 120 is not shown in FIG. 4. FIG. 5 is a plan view of the fixing device 130 as viewed in the X direction. The main difference between the fixing device 130 of the second embodiment and the fixing device 30 of the first embodiment is that a first member 131 is composed of a plurality of members. In the second embodiment, configurations similar to those of the first embodiment are denoted by the same signs, and description thereof will be omitted as appropriate.

As shown in FIG. 4, the fixing device 130 according to the second embodiment has the first member 131 and a second member 134 like the fixing device 30 according to the first embodiment. The second member 134 has the other end portion 130b and a fastening second member portion 134a. The first member 131 according to the present embodiment includes a boss-side member 132, a vehicle body-side member 133, and an elastic body 136. For example, the boss-side member 132 and the vehicle body-side member 133 are formed by pressing a flat sheet material. The boss-side member 132 has one end portion 130a and a first joint portion 132a located in a portion different from the one end portion 130a. The vehicle body-side member 133 has one end that is a second joint portion 133a facing the first joint portion 132a, and a fastening first member portion 133c that is the other end connected to the second member 134. The elastic body 136 is located between the first joint portion 132a and the second joint portion 133a.

As in the first embodiment, the one end portion 130a having a generally annular shape is placed in such a manner that the radial direction of the one end portion 130a matches the radial direction of the boss 12. The one end portion 130a is sandwiched and fixed between the end of the opening portion 12f of the boss 12 and the valve 120 in the X direction. The valve 120 has a first cylindrical valve portion 120a and a second cylindrical valve portion 120b. The one end portion 130a is placed so as to cover the outer periphery of the second cylindrical valve portion 120b of the valve 120. As in the first embodiment, the thickness T in the X direction of the one end portion 130a is about 1 mm or more and 3 mm or less.

The one end portion 130a has a generally annular shape as in the first embodiment. However, unlike the first embodiment, an inner peripheral surface of the one end portion 130a is octagonal as viewed in the X direction (see FIG. 5). The shape of an outer peripheral surface 120d of the second cylindrical valve portion 120b of the valve 120 according to the second embodiment as viewed in the X direction is an octagon conforming to the shape of the inner peripheral surface of the one end portion 130a (see FIG. 5). This configuration restricts rotation of the one end portion 130a about the central axis AX with respect to the second cylindrical valve portion 120b. In step P20 (FIG. 3) of the process of attaching the tank 10 to the vehicle body 201, the one end portion 130a of the first member 131 is fitted on the second cylindrical valve portion 120b of the valve 120 at a predetermined position relative to the valve 120. In step P30, the valve 120 with the first member 131 fitted thereon is inserted and screwed into the boss 12. Rotation of the one end portion 130a about the central axis AX with respect to the second cylindrical valve portion 120b is thus restricted. In this manner, the valve 120 and the vehicle body 201 can be positioned relative to each other as designed, and the fixing device 130 and the vehicle body 201 can also be positioned relative to each other as designed. Since a gas pipe is connected to the valve 120 as described above, it is necessary to position the valve 120 and the vehicle body 201 relative to each other as designed. Since the fixing device 130 is fixed at the other end portion 130b to the vehicle body 201, it is necessary to position the fixing device 130 and the vehicle body 201 relative to each other as designed. By fitting the first member 131 on the valve 120 at the predetermined position relative to the valve 120, the valve 120 and the vehicle body 201 can be positioned relative to each other as designed, and the fixing device 130 and the vehicle body 201 can be positioned relative to each other as designed. The shape of the outer peripheral surface 120d and the shape of the inner peripheral surface of the one end portion 130a as viewed in the direction along the central axis AX are not limited to the octagon, and may be a shape with parallel sides facing each other with the central axis AX therebetween, such as a hexagon. When the outer peripheral surface 120d and the inner peripheral surface of the one end portion 130a have the same shape, rotation of the one end portion 130a about the central axis AX with respect to the second cylindrical valve portion 120b can be restricted.

The first joint portion 132a of the boss-side member 132 has a first intermediate portion 132aa and a second intermediate portion 132ab. The first intermediate portion 132aa has a cylindrical shape. The second intermediate portion 132ab has an annular shape. The first intermediate portion 132aa extends in the direction of the central axis AX of the tank 10. Specifically, the central axis of the first intermediate portion 132aa matches the direction of the central axis AX. In the present embodiment, the second intermediate portion 132ab extends in the direction away from the boss 12 in the radial direction of the tank body 11 perpendicular to the central axis AX. Specifically, the radial direction of the second intermediate portion 132ab is the radial direction of the tank body 11 that is perpendicular to the central axis AX and that is away from the boss 12. The radial direction of the second intermediate portion 132ab, namely the direction in which the second intermediate portion 132ab extends, is not limited to the direction perpendicular to the central axis AX, and may be any direction that crosses the central axis AX and that is away from the boss 12.

The second joint portion 133a of the vehicle body-side member 133 has a first opposing portion 133aa and a second opposing portion 133ab. The first opposing portion 133aa faces the first intermediate portion 132aa, and the second opposing portion 133ab faces the second intermediate portion 132ab. The first opposing portion 133aa has a cylindrical shape about the central axis AX, and is placed around the first intermediate portion 132aa so as to cover the first intermediate portion 132aa. The second opposing portion 133ab is located at the end in the −X direction of the first opposing portion 133aa. The planar shape of the second opposing portion 133ab as viewed in the X direction is an annular shape (see FIG. 5). The fastening first member portion 133c is a portion located on the +Z direction side with respect to the central axis AX of the second opposing portion 133ab and extends beyond the end of the second intermediate portion 132ab in the +Z direction. The first member 131 is connected to the second member 134 at the end in the +Z direction of the fastening first member portion 133c.

The first intermediate portion 132aa is separated from the boss 12. Specifically, there is clearance C between the outer peripheral surface of the first knob portion 12c and the inner peripheral surface of the first intermediate portion 132aa. The clearance C is about 0.5 mm or more and 1 mm or less. Since there is the clearance C, the valve 120 with the first member 131 fitted thereon can be attached to the boss 12 without interfering with the boss 12. For example, even when stress greater than stress that can be absorbed by deformation of the elastic body 136 is applied to the fixing device 130 due to interference with the road surface during traveling, the first member 131 deforms so that the first intermediate portion 132aa gets closer to the boss 12 with the one end portion 130a as a base point. The first member 131 can thus absorb the stress. Even when stress is applied to the fixing device 130 and the first member 131 deforms so that the first intermediate portion 132aa gets closer to the boss 12 with the one end portion 130a as a base point, the amount of deformation of the first member 131 is limited due to the small clearance C, and the shape of the first member 131 is maintained without causing plastic deformation.

The elastic body 136 is a member having elasticity. For example, the elastic body 136 is rubber. The elastic body 136 is not limited to rubber, and may be other elastomer. The elastic body 136 has a first connecting portion 136a and a second connecting portion 136b. The first connecting portion 136a connects the first intermediate portion 132aa and the first opposing portion 133aa. The second connecting portion 136b connects the second intermediate portion 132ab and the second opposing portion 133ab. Specifically, the elastic body 136 is bonded to the boss-side member 132 and the vehicle body-side member 133 with, for example, an adhesive. Since the elastic body 136 is interposed between the first joint portion 132a and the vehicle body-side member 133, the elastic body 136 absorbs vibration and thus reduces transmission of vibration produced during operation of the valve 120 to a vehicle cabin. The elastic body 136 also reduces transmission of vibration of the vehicle body 201 produced during traveling of the vehicle 200 to the valve 120.

Since the elastic body 136 has the first connecting portion 136a and the second connecting portion 136b as described above, deterioration of the elastic body 136 is reduced. The length in the X direction of the tank 10 changes according to the gas filling rate. For example, when the empty tank 10 is fully filled with gas, the length in the X direction of the tank 10 expands by about 1%. Since the tank 10 slides with respect to the band 40 (FIG. 1) during expansion and contraction, the fixing device 30 is subjected to a reaction force due to the frictional force between the band 40 and the tank 10. Specifically, the first member 131 moves in the +X direction with respect to the second member 134 during expansion. The first member 131 moves in the −X direction with respect to the second member 134 during contraction.

Accordingly, stress is applied to the elastic body 136 according to the expansion and contraction of the tank 10. Since the elastic body 136 has the first connecting portion 136a and the second connecting portion 136b, the applied stress can be dispersed. Rubber has properties of being easily degraded by shear stress. Since stress that is applied to the second intermediate portion 132ab due to expansion and contraction of the tank 10 is not shear stress but compressive stress or tensile stress, degradation of the elastic body 136 can be reduced.

As shown in FIG. 5, the fasteners 50 for fastening the other end portion 130b to the fixing portion 201a (FIG. 1) of the vehicle body 201 are positioned so as not to overlap the first opposing portion 133aa in the Y direction. Since the fasteners 50 are positioned so as not to overlap the first opposing portion 133aa in the Y direction, an operator can easily attach the fasteners 50. The number of fasteners 50 is not limited to two, and may be one or three or more. The same applies to the fasteners 35.

According to the second embodiment described above, as in the first embodiment, the fixing device 130 is fixed to the boss 12 by sandwiching the one end portion 130a between the boss 12 and the valve 120. Since the boss 12 need not have an engaged portion, it is less likely that the tank capacity is reduced due to the increase in length of the boss 12. The fixing device 130 includes the first member 131, the second member 134, and the elastic body 136 placed between the first member 131 and the second member 134. Since vibration produced by the valve 120 can be absorbed by the elastic body 136, transmission of the vibration to the vehicle body 201 via the fixing device 130 is reduced. The elastic body 136 has the first and second connecting portions 136a, 136b extending in different directions. Stress applied to the elastic body 136 when the tank 10 expands and contracts in the X direction can therefore be distributed to the first connecting portion 136a and the second connecting portion 136b. When the tank 10 expands and contracts in the X direction, compressive stress or tensile stress is applied to the second connecting portion 136b instead of shear stress. Since the elastic body 136 tends to be degraded by shear stress, degradation of the elastic body 136 can be reduced by using a configuration in which compressive stress or tensile stress is applied. The first intermediate portion 132aa is separated from the boss 12. Accordingly, the valve 20 with the first member 131 attached thereto can be attached to the boss 12 without interference between the fixing device 130 and the boss 12.

C. Third Embodiment

Figure 6:
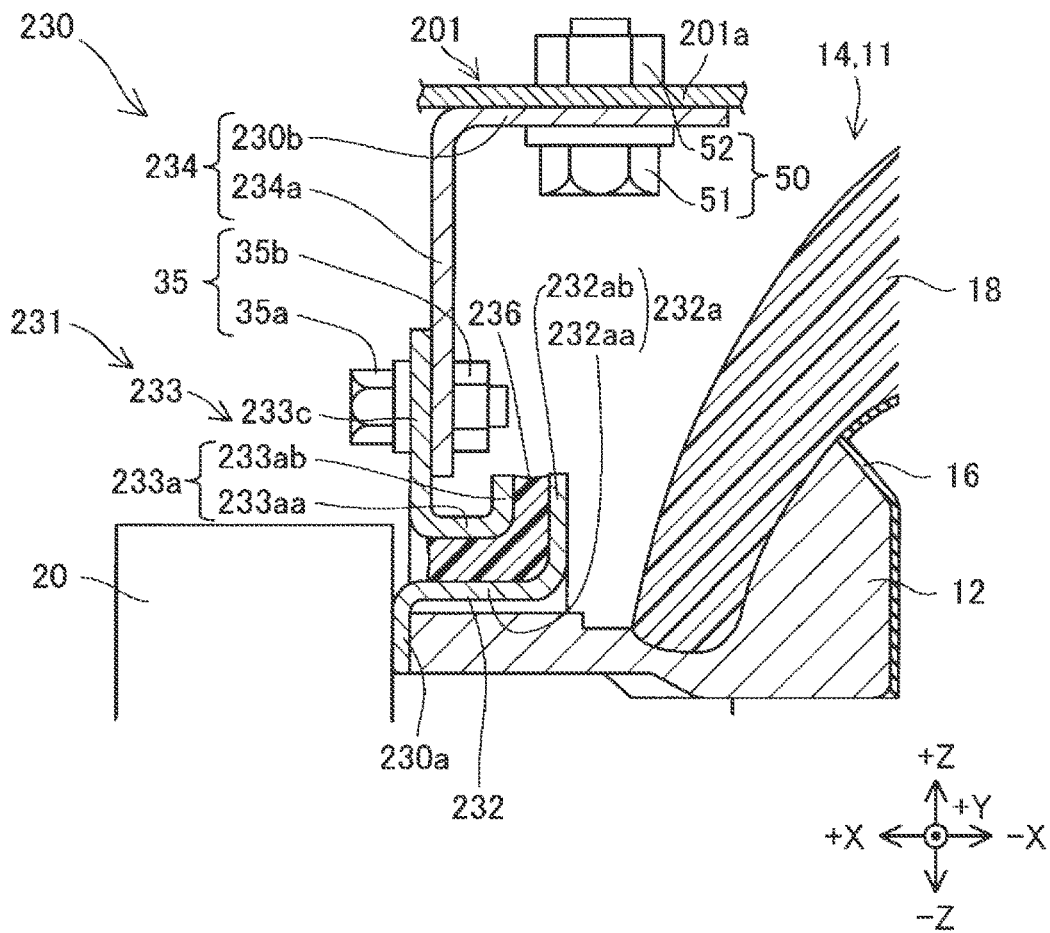
FIG. 6 is a sectional view of a fixing device according to a third embodiment.
Figure 7:
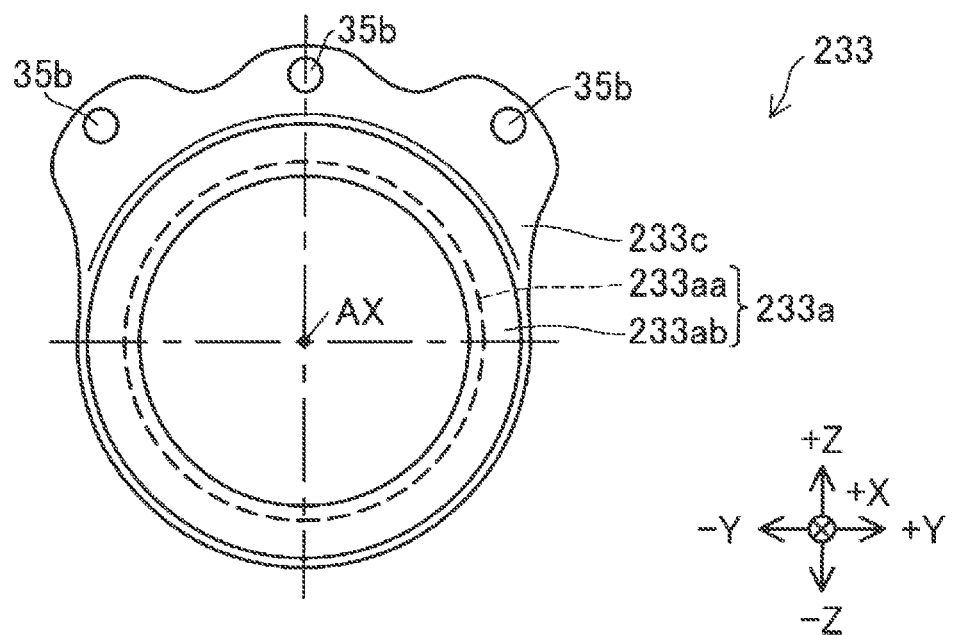
FIG. 7 is a plan view of a vehicle body-side member according to the third embodiment.

A fixing device 230 according to a third embodiment will be described. FIG. 6 is a sectional view of the fixing device 230 attached to the tank 10, taken along a plane passing through the central axis AX and extending in the +Z direction. FIG. 7 is a plan view of a vehicle body-side member 233 as viewed in the −X direction. The main difference between the fixing device 230 of the third embodiment and the fixing device 130 of the second embodiment is the shape of the vehicle body-side member 233.

As shown in FIG. 6, the fixing device 230 includes a first member 231 and a second member 234. The second member 234 has the other end portion 230b and a fastening second member portion 234a. The first member 231 includes a boss-side member 232, the vehicle body-side member 233, and an elastic body 236. Since the boss-side member 232, the elastic body 236, and the second member 234 according to the present embodiment have shapes similar to the boss-side member 132, the elastic body 136, and the second member 134 according to the second embodiment, respectively, description thereof will be omitted.

The vehicle body-side member 233 according to the present embodiment has a second joint portion 233a and a fastening first member portion 233c that is the other end connected to the second member 234. The second joint portion 233a has a first opposing portion 233aa and a second opposing portion 233ab. The first opposing portion 233aa faces the first intermediate portion 232aa, and the second opposing portion 233ab faces the second intermediate portion 232ab. The first opposing portion 233aa has a cylindrical shape about the central axis AX, and is placed so as to cover the first intermediate portion 232aa. The second opposing portion 233ab extends in the +Z direction from the end in the −X direction of the first opposing portion 233aa. The planar shape of the second opposing portion 233ab is an annular shape (see FIG. 7). The fastening first member portion 233c extends in the +Z direction from the end in the +X direction of the first opposing portion 233aa. The end in the +Z direction of the fastening first member portion 233c and the end in the −Z direction of the fastening second member portion 234a are fixed together by the fasteners 35. The second member 234 is fixed to the fastening first member portion 233c extending in the +Z direction from the end in the +X direction of the first opposing portion 233aa. The distance between the reinforcing layer 18 and the fastener 35 can therefore be made greater than the distance between the reinforcing layer 18 and the fastener 35 according to the second embodiment. For example, attachment work such as fastening of the fasteners 35 can thus be efficiently performed.

D. Fourth Embodiment

Figure 8:
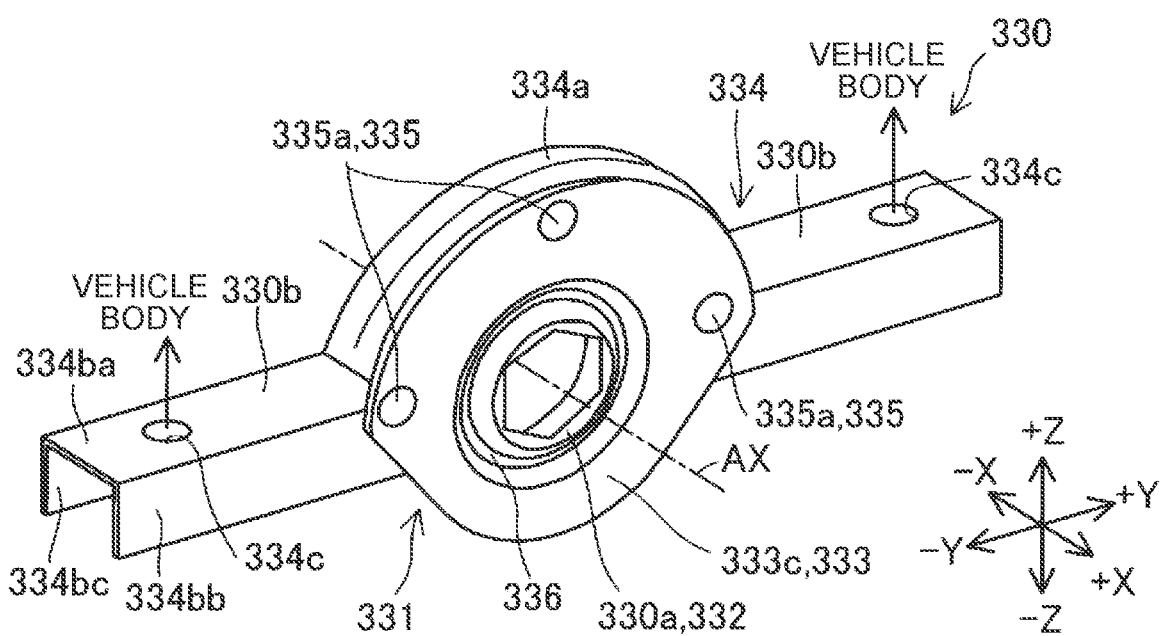
FIG. 8 is a perspective view of a fixing device according to a fourth embodiment.
Figure 9:
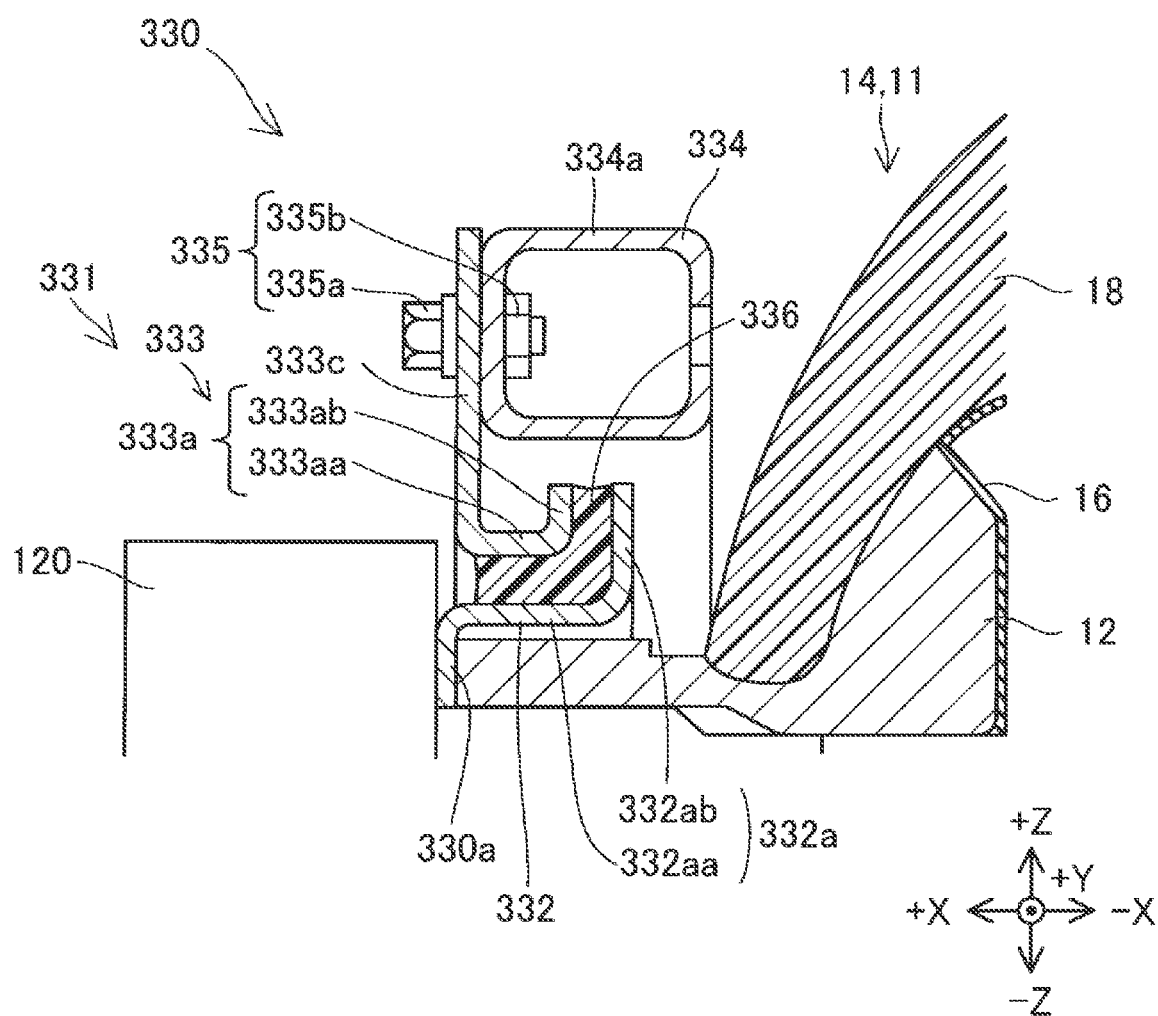
FIG. 9 is a sectional view of the fixing device according to the fourth embodiment.

A fixing device 330 according to a fourth embodiment will be described. FIG. 8 is a perspective view of the fixing device 330. FIG. 9 is a sectional view of the fixing device 330 attached to the tank 10, taken along a plane passing through the central axis AX and extending in the +Z direction. The main difference between the fixing device 330 of the fourth embodiment and the fixing device 230 of the third embodiment is the shape of a second member 334.

As shown in FIG. 8, the fixing device 330 includes a first member 331 and the second member 334. The first member 331 includes a boss-side member 332, a vehicle body-side member 333, and an elastic body 336. As shown in FIG. 9, the boss-side member 332 has one end portion 330a and a first joint portion 332a. The first joint portion 332a has a first intermediate portion 332aa and a second intermediate portion 332ab. The vehicle body-side member 333 has a second joint portion 333a and a fastening first member portion 333c. The second joint portion 333a has a first opposing portion 333aa and a second opposing portion 333ab. A fastener 335 has a bolt 335a and a weld nut 335b. Since the first member 331 according to the present embodiment has a shape similar to the first member 231 according to the third embodiment, description thereof will be omitted.

As shown in FIG. 8, the second member 334 according to the present embodiment has a fastening second member portion 334a and two other end portions 330b. The shape of the fastening second member portion 334a as viewed in the X direction is generally semicircular and overlaps a part of the fastening first member portion 333c located on the +Z direction side with respect to the central axis AX. As shown in FIG. 9, the fastening second member portion 334a has a hollow shape, and the weld nut 335b that is used to fix the fastening second member portion 334a to the fastening first member portion 333c is placed inside the fastening second member portion 334a. As shown in FIG. 8, the first member 331 and the second member 334 are fastened by three fasteners 335. The two other end portions 330b extend in the +Y direction and the −Y direction with the fastening second member portion 334a as a base. Each of the two other end portions 330b has a fastening surface 334ba and side surfaces 334bb, 334bc. The fastening surface 334ba is substantially perpendicular to the Z direction, and the side surfaces 334bb, 334bc are continuous with the fastening surface 334ba. The side surfaces 334bb, 334bc are surfaces extending in the −Z direction from both ends in the X direction of the fastening surface 334ba. The fastening surface 334ba has a through hole 334c in its end in the Y direction. The tank 10 is attached to the fixing portion 201a by inserting bolts through the through holes 334c and tightening nuts on the bolts with the fixing portion 201a (see FIG. 1) of the vehicle body 201 interposed between the nut and the bolt. Since each of the other end portions 330b extends in the direction away from the boss 12 in the Y direction and has the through hole 334c in its end, the operator can easily attach the tank 10 to the vehicle body 201 by using the first member 331 and the second member 334.

E. Other Embodiments

E1

Figure 10:
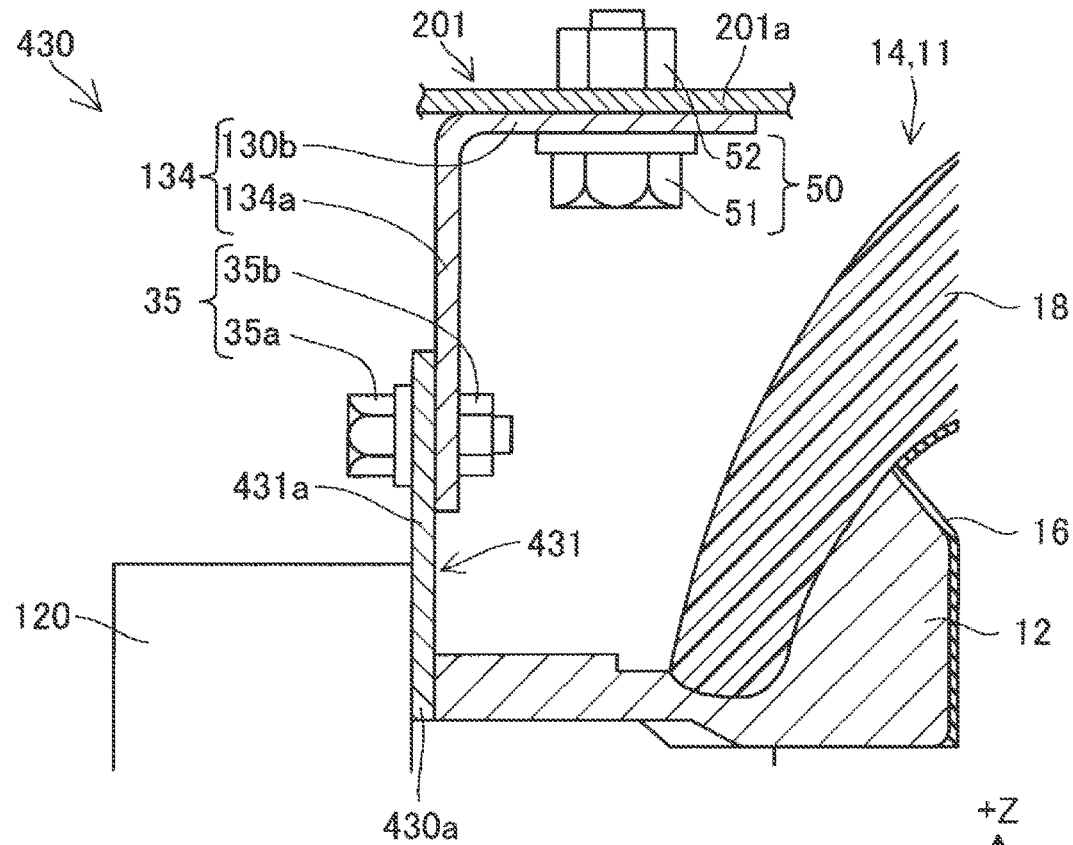
FIG. 10 is a sectional view of a fixing device according to a further embodiment.

FIG. 10 is a sectional view of a fixing device 430 according to the present embodiment, taken along a plane passing through the central axis AX and extending in the Z direction. In the fixing device 30 according to the first embodiment, the first member 31 has the cylindrical first member portion 31b. However, the fixing device 430 according to the present embodiment does not have the cylindrical first member portion 31b. Specifically, the shape of a first member 431 as viewed in the Y direction is not a bent shape but is a linear shape from one end portion 430a toward a fastening first member portion 431a. Since the first member 431 has a plate shape, the manufacturing cost can be reduced.

E2

In the fixing device 30 according to the first embodiment, the first member 31 and the second member 34 are fixed to each other by the fasteners 35. However, a component having the combined shape of the first and second members 31, 34 may be used as a component of the fixing device 30. Alternatively, a component that does not have a bent shape but has a linear shape from the one end portion 30a toward the other end portion 30b may be used, or a component bent at a plurality of positions between the one end portion 30a and the other end portion 30b may be used. This configuration reduces the number of components and thus reduces manufacturing cost.

E3

Figure 11:
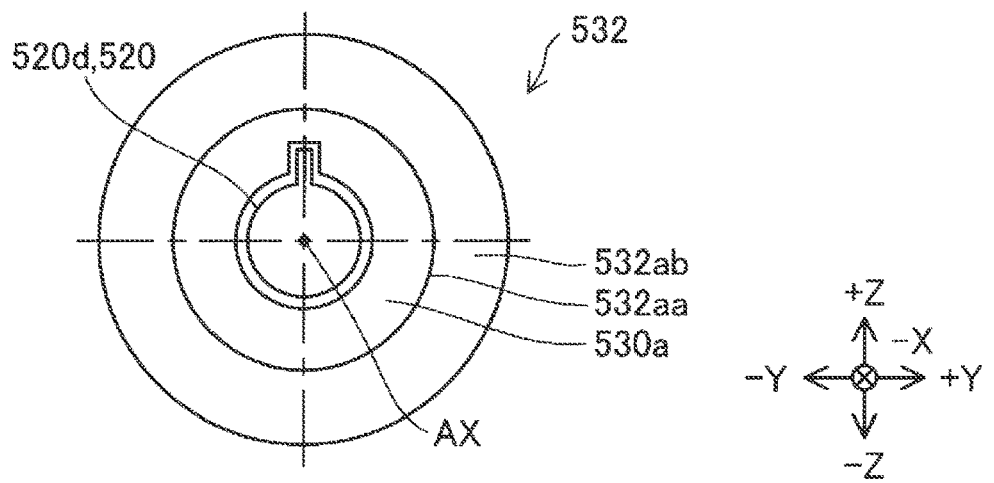
FIG. 11 is a plan view of a first member according to a still further embodiment.

FIG. 11 is a plan view of a boss-side member 532 according to the present embodiment as viewed in the X direction. In the boss-side member 532 of the present embodiment, the shape of the inner peripheral surface of one end portion 530a as viewed in the X direction is different from the shape of the inner peripheral surface of the one end portion 130a according to the second embodiment. A part of the inner peripheral surface of the one end portion 530a is recessed in the radial direction as viewed in the X direction. A part of an outer peripheral surface 520d of a valve 520 according to the present embodiment protrudes in the radial direction so as to conform to the shape of the inner peripheral surface of the one end portion 530a. Since a part in the circumferential direction of the outer peripheral surface 520d protrudes and the inner peripheral surface of the one end portion 530a has a shape conforming to the outer peripheral surface 520d, rotation of the one end portion 530a about the central axis AX with respect to the valve 520 is restricted. The boss-side member 532 according to the present embodiment has the one end portion 530a, a first intermediate portion 532aa, and a second intermediate portion 532ab. The structures of the first and second intermediate portion 532aa, 532ab are similar to the structures of the first and second intermediate portions 132aa, 132ab according to the second embodiment, respectively.

E4

In the fixing device 130 according to the second embodiment, there is clearance C between the outer peripheral surface of the first knob portion 12c and the inner peripheral surface of the first intermediate portion 132aa. However, there may be no clearance C between the outer peripheral surface of the first knob portion 12c and the inner peripheral surface of the first intermediate portion 132aa. In this case, the fixing device 130 is not allowed to rotate relative to the boss 12. Accordingly, the valve 120 is fastened to the boss 12 by a method different from screwing. Specifically, the boss 12 and the valve 120 may have a flange, and the valve 120 may be fixed to the boss 12 by fastening the flange of the boss 12 and the flange of the valve 120 together. In the fixing device 130 according to the second embodiment, the shape of the inner peripheral surface of the one end portion 130a as viewed in the X direction is an octagon conforming to the outer peripheral surface of the second cylindrical valve portion 20b. However, the shape of the inner peripheral surface of the one end portion 130a may be a circle in contact with the outer peripheral surface 120d of the second cylindrical valve portion 120b.

E5

In the first embodiment, the end in the −X direction of the tank 10 is fixed to the vehicle body 201 by using the band 40. In the configuration in which a metal fitting for fixing the tank 10 to the vehicle body 201 is provided on the second dome portion 15 of the tank 10, the tank 10 may be attached to the vehicle body 201 by using the metal fitting attached to the second dome portion 15 instead of the band 40.

E6

In the first embodiment, the valve 20 is fixed in the opening portion 12f of the boss 12. The component that is fixed in the opening portion 12f and that together with the boss 12 sandwiches the one end portion 30a therebetween is not limited to the valve 20. This component may be a flow path member having a flow path and not provided with an on-off valve. The present embodiment can also be implemented in a configuration in which the on-off valve is a separate member from the flow path member.

E7

In the second embodiment, the second intermediate portion 132ab has an annular shape. The shape of the second intermediate portion 132ab is not limited to the annulus shape, and may be, for example, an annular shape missing a part in the circumferential direction. As long as the second intermediate portion 132ab and the second opposing portion 133ab are provided on at least a part of the outer periphery of the boss 12 of the first member 131 so as to extend in a direction crossing the direction of the central axis AX of the tank 10, the load that is applied to the elastic body 136 can be dispersed by providing the second connecting portion 136b between the first intermediate portion 132aa and the second opposing portion 133ab. The boss-side member 132 may not have the second intermediate portion 132ab, and the elastic body 136 may not have the second connecting portion 136b. Interposing the elastic body 136 between the boss-side member 132 and the vehicle body-side member 133 can reduce transmission of vibration to the vehicle body 201 via the fixing device 130.

The present disclosure is not limited to the above embodiments, and can be implemented with various configurations without departing from the spirit and scope of the present disclosure. For example, the technical features of the embodiments corresponding to the technical features in each mode described in the section "SUMMARY" may be replaced or combined as appropriate to solve some or all of the above problems or to achieve some or all of the above effects. When the technical features are not described as essential in this specification, such technical features can be omitted as appropriate.

What is claimed is:

1. A tank device configured to be mounted on a vehicle body, the tank device comprising:
   a tank; and
   a fixing device that fixes the tank to the vehicle body, the fixing device including a first member and a second member, the first member including a first end portion, and the second member being connected to the first member and including a second end portion, wherein:
   the tank includes a boss and a flow path member fixed in an opening portion of the boss, the flow path member serving as a flow path that allows inside of the tank to communicate with outside;
   the first end portion is sandwiched between an end of the opening portion and the flow path member, and the second end portion is fixed to a fixing portion of the vehicle body; and
   the first member includes
   a boss-side member including a first joint portion in a portion different from the first end portion,
   a vehicle body-side member including a first end and a second end, the first end being a second joint portion facing the first joint portion, and the second end being connected to the second member, and
   an elastic body located between the first joint portion and the second joint portion and connecting the first joint portion and the second joint portion.

2. The tank device according to claim 1, wherein:
   the first joint portion includes a first intermediate portion and a second intermediate portion, the first intermediate portion extending in an axial direction of the tank, and the second intermediate portion extending in a direction that crosses the axial direction and that is away from the boss;
   the second joint portion includes a first opposing portion and a second opposing portion, the first opposing portion facing the first intermediate portion, and the second opposing portion facing the second intermediate portion; and
   the elastic body includes a first connecting portion and a second connecting portion, the first connecting portion connecting the first intermediate portion and the first opposing portion, and the second connecting portion connecting the second intermediate portion and the second opposing portion.

3. The tank device according to claim 2, wherein the first intermediate portion is separated from the boss.

* * * * *